United States Patent
Agrawal et al.

(10) Patent No.: US 7,103,360 B2
(45) Date of Patent: **\*Sep. 5, 2006**

(54) SWITCHING TELEPHONE CALLS BETWEEN WIRELINE AND CELLULAR TELEPHONES

(75) Inventors: Prathima Agrawal, New Providence, NJ (US); Parameswaran Ramanathan, Madison, WI (US)

(73) Assignee: Telcordia Technologies, Inc., Piscataway, NJ (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/045,346

(22) Filed: Oct. 23, 2001

(65) Prior Publication Data

US 2002/0068575 A1    Jun. 6, 2002

Related U.S. Application Data

(63) Continuation of application No. 09/223,466, filed on Dec. 30, 1998, now abandoned.

(51) Int. Cl.
*H04Q 7/20* (2006.01)
(52) U.S. Cl. .............. 455/445; 455/524; 455/415
(58) Field of Classification Search ........ 455/415, 455/422, 433, 435, 445, 446, 456, 517, 524, 455/404, 414, 554, 462, 461, 465, 553, 426.2, 455/452.2, 422.1, 552.1, 426.1; 379/212, 379/220, 114, 115, 211, 219, 221, 229, 114.02, 379/220.01, 211.01, 211.02, 212.01, 114.01
See application file for complete search history.

(56) References Cited

U.S. PATENT DOCUMENTS

| | | | |
|---|---|---|---|
| 4,775,997 A | 10/1988 | West, Jr. et al. | 455/554 |
| 5,148,472 A | 9/1992 | Freese et al. | 455/408 |
| 5,379,339 A | 1/1995 | Sakamoto | 455/554 |
| 5,454,032 A | 9/1995 | Pinard et al. | 455/445 |
| 5,465,295 A * | 11/1995 | Furman | 379/221.14 |
| 5,535,431 A | 7/1996 | Grube et al. | 455/456 |
| 5,544,227 A | 8/1996 | Blust et al. | 455/426 |
| 5,590,172 A | 12/1996 | Lodwig et al. | 455/436 |
| 5,590,187 A | 12/1996 | Greenspan | 379/212 |
| 5,633,873 A | 5/1997 | Kay et al. | 370/336 |
| 5,638,434 A | 6/1997 | Gottlieb et al. | 379/203 |
| 5,659,601 A | 8/1997 | Cheslog | 455/406 |
| 5,664,005 A * | 9/1997 | Emery et al. | 455/422.1 |
| 5,664,007 A | 9/1997 | Samadi et al. | 379/212 |
| 5,673,308 A | 9/1997 | Akhavan | 379/61 |
| 5,689,548 A | 11/1997 | Maupin et al. | 455/404 |
| 5,703,930 A | 12/1997 | Miska et al. | 455/554 |
| 5,724,656 A * | 3/1998 | Vo et al. | 455/422 |
| 5,742,904 A | 4/1998 | Prinder et al. | 455/404 |
| 5,757,902 A | 5/1998 | Mitsuo | 379/212 |
| 5,758,281 A | 5/1998 | Emery et al. | 379/220 |
| 5,771,465 A | 6/1998 | Bojeryd | 455/554 |

(Continued)

*Primary Examiner*—Naghmeh Mehrpour
(74) *Attorney, Agent, or Firm*—Joseph Giordano

(57) ABSTRACT

A telephone subscriber having both a wireline and a cellular telephone can switch calls between these phones. A routing table identifies that a subscriber is entitled to this service, and a look up table maintains the telephone numbers of the two different telephones. Upon detection of a unique signal indicating a request for switching a call connected to one of the telephones to the other telephone, a connection is made to the other telephone, the two connections are bridged, and then the first connection is dropped. The routing table may be maintained in a central office and the look up table may be maintained in a mobile switching center or a fixed cellular mobility agent.

19 Claims, 13 Drawing Sheets

U.S. PATENT DOCUMENTS

| | | | |
|---|---|---|---|
| 5,778,313 A | 7/1998 | Fougnies et al. | 455/408 |
| 5,842,122 A | 11/1998 | Schellinger et al. | 455/403 |
| 5,848,771 A * | 12/1998 | Hancock-Bogese et al. | 248/74.3 |
| 5,850,391 A * | 12/1998 | Essigmann | 370/331 |
| 5,854,977 A | 12/1998 | Oksanen et al. | 455/417 |
| 5,867,785 A * | 2/1999 | Averbuch et al. | 455/436 |
| 5,889,844 A | 3/1999 | Kim et al. | 379/202 |
| 5,907,802 A | 5/1999 | Scott | 455/406 |
| 5,913,165 A | 6/1999 | Foti | 455/435 |
| 5,920,815 A | 7/1999 | Akhavan | 455/426 |
| 5,937,354 A | 8/1999 | Bala et al. | 455/459 |
| 5,963,869 A * | 10/1999 | Fehnel | 455/511 |
| 5,966,660 A | 10/1999 | Jonsson | 455/445 |
| 6,006,094 A * | 12/1999 | Lee | 455/445 |
| 6,023,621 A * | 2/2000 | Jackson et al. | 455/452.2 |
| 6,038,451 A | 3/2000 | Syed et al. | 455/445 |
| 6,038,452 A * | 3/2000 | Strawczynski et al. | 455/446 |
| 6,049,719 A | 4/2000 | Schroter | 455/462 |
| 6,052,592 A * | 4/2000 | Schellinger et al. | 455/445 |
| 6,058,178 A | 5/2000 | McKendry et al. | 379/212 |
| 6,141,560 A * | 10/2000 | Gillig et al. | 455/550 |
| 6,188,905 B1 * | 2/2001 | Rudrapatna et al. | 455/452.2 |
| 6,208,864 B1 * | 3/2001 | Agrawal et al. | 455/445 |
| 6,212,377 B1 * | 4/2001 | Dufour et al. | 455/426.2 |
| 6,216,005 B1 * | 4/2001 | Agrawal et al. | 455/445 |
| 6,253,088 B1 * | 6/2001 | Wenk et al. | 455/462 |
| 6,370,132 B1 * | 4/2002 | Saxena | 370/349 |
| 6,374,102 B1 * | 4/2002 | Brachman et al. | 455/422.1 |
| 6,847,821 B1 * | 1/2005 | Lewis et al. | 455/452.2 |
| 6,850,758 B1 * | 2/2005 | Paul et al. | 455/422.1 |
| 6,892,079 B1 * | 5/2005 | Rautiainen | 455/561 |

* cited by examiner

SWITCHING TELEPHONE CALLS BETWEEN WIRELINE AND CELLULAR TELEPHONES

RELATED APPLICATIONS

This application is a continuation of Ser. No. 09/223,466, filed Dec. 30, 1998, now abandoned. It is also related to Agrawal et al U.S. Pat. No. 6,208,864, Mar. 27, 2001, and U.S. Pat. No. 6,216,005, Apr. 20, 2001.

FIELD OF THE INVENTION

This invention relates generally to telecommunications services and, more particularly, to incorporating a cellular-fixed call transfer service into the conventional public switched telephone network in combination with the conventional cellular network.

BACKGROUND OF THE INVENTION

Most individuals now, or in the near future will, have at least two telephone numbers through which they make or receive calls on a regular basis. One of these telephone numbers is usually associated with a local access provider while the other is usually associated with a cellular service provider. The connectivity from the local access provider is to the traditional fixed telephone network (oftentimes referred to as the Public Switched Telephone Network (PSTN)) while the connectivity from the cellular service provider is to the cellular network (CN). For discussion purposes below, let $N_f$ and $N_c$ respectively denote the telephone number for a particular user to the fixed and cellular network.

The calls made from $N_f$ are usually of lower cost than those made or received from $N_c$ because the call is routed over the fixed network and therefore does not make use of the limited wireless bandwidth. However, once a call has been initiated on the fixed network, the user has very little mobility; a cordless phone may allow the user to move 50–100 meters from the base of the phone without significant deterioration in the voice quality. However, a user can move in a wide geographical area if a user could transfer an on-going call originated over the fixed network to the cellular network. A point of departure from the prior art in accordance with the present invention is a new call transfer service called the Cellular-Fixed Call Transfer Service (CFCTS) which can be offered by the cellular network provider to allow users to transfer on-going calls between the his/her fixed and cellular telephone numbers.

The CFCTS service benefits both the user and the service provider. The user benefits because he/she can use the lower cost calls through the fixed network whenever possible without sacrificing mobility. The service provider also benefits because as users switch over to fixed network from cellular whenever possible, the limited capacity of the cellular network can support other users. More customers will also be attracted to this lower cost service with full support for mobility. Also, when a user transfers a call from his/her $N_f$ to $N_c$ the cellular network provider gains additional business.

HEURISTIC EXAMPLE 1

Suppose that a user receives a call at home on $N_f$ just as she is about to leave for work. At present, the user has only one of the following two options. Either complete the call before starting the commute to work or terminate the conversation and restart it using the cellular phone. Terminating the conversation and restarting it using the cellular phone requires all parties in the call to hangup and reestablish the necessary connections. This is clearly troublesome.

However, if the user can transfer the call over to her cellular telephone without disrupting the conversation, then the call can be continued while the user is in commute.

In this example, the user benefits because she gets mobility while using the lower cost of the fixed network for as long as possible. The cellular network provider also benefits because a call has been transferred to it from another service provider.

HEURISTIC EXAMPLE 2

Suppose that a user makes a call using his cellular telephone while away from home and comes back home while the call is in progress. There will be no degradation in the voice quality and the user can continue using the more expensive cellular network while at home. However, if the user can transfer the call to his fixed telephone, the cost of the rest of call will be lower. The service provider will also benefit because as users switch over to the fixed network, the limited capacity of the cellular network can be used to support other users. In this example, the reason for the transfer capability is reduced cost to the user.

The prior art does not allow transfer of on-going calls from a fixed network to a cellular network and vice versa. Some service providers offer forwarding of calls from the fixed to the cellular network prior to the establishment of a call, such as by conventional call-forwarding. Similarly, some fixed network service providers offer transfer of on-going calls from one fixed telephone number to another, typically at the request/intervention of the called party.

SUMMARY OF THE INVENTION

These shortcomings and other limitations and deficiencies of the prior art are obviated, in accordance with the present invention, by a methodology and concomitant circuitry effected by introducing a Fixed-Cellular Mobility Agent (FCMA) into the cellular network, the FCMA having at least the functionality of a PSTN central office for interconnecting incoming/outgoing calls to the MSC as outgoing/incoming calls to the CN or the PSTN and which, in addition, monitors each call connection to carry out call transfers between the CN and the PSTN.

In accordance with a broad method aspect of the call transfer aspect of the present invention, a method for transferring an established call path on the Public Switched Telephone Network (PSTN) to a call on the Cellular Network (CN), the PSTN including a central office (CO) serving the called party, the CN including a mobile switching center (MSC) serving the called party, the established call path including a first call connection between the calling party and the MSC and a second connection between the called party and the MSC, includes: (a) monitoring the second call connection to detect a request for a call transfer by the called party; (b) altering the MSC of the call transfer request: (c) obtaining a cellular telephone number $N_c$ assigned to the called party; (d) initiating by the MSC an outgoing call to the $N_c$; (d) whenever the outgoing call to a cellular telephone assigned the $N_c$ is answered, establishing a third call connection between the MSC and the cellular telephone; and (e) bridging the first call connection and the third call connection and terminating the second call connection.

In accordance with another broad aspect of the call transfer aspect of the present invention, a method for transferring an established call path on the Cellular Network (CN) to a call on the Public Switched Telephone Network (PSTN), the PSTN including a central office (CO) serving the called party, the CN including a mobile switching center (MSC) serving the called party, the established call path including a first call connection between the calling party and the MSC and a second connection between the called party and the MSC, includes: (a) monitoring second call connection to detect a request for a call transfer by the called party; (b) alerting the MSC of the call transfer request; (c) obtaining a fixed telephone number $N_f$ assigned to the called party; (d) initiating by the MSC an outgoing call to the $N_f$; (f) whenever the outgoing call to the $N_f$ is answered by a fixed telephone associated with the $N_f$, establishing a third call connection between the MSC and the fixed telephone; and (g) bridging the first call connection and the third call connection and terminating the second call connection.

In accordance with broad system aspects of the present invention, concomitant circuitry effects the aforementioned methodology.

BRIEF DESCRIPTION OF THE DRAWING

To facilitate understanding, identical reference numerals have been used, where possible, to designate identical elements that are common to the figures.

DETAILED DESCRIPTION

It is instructive to first consider the conventional operation of the Public Switched Telephone Network (PSTN) working in conjunction with the Cellular Network (CN) in exemplary scenarios, namely, when handling (1) a telephone call from a calling party (designated R for "remote") to a called party (designated $U_f$ for "fixed user") solely over the PSTN; and (2) a telephone call from calling party R to a called party (designated $U_c$ for "cellular user") on the CN. The primary purpose for elucidating this conventional operation is that of highlighting the functionalities of the PSTN and the CN which are utilized in accordance with the various aspects of the present invention.

Figure 1:
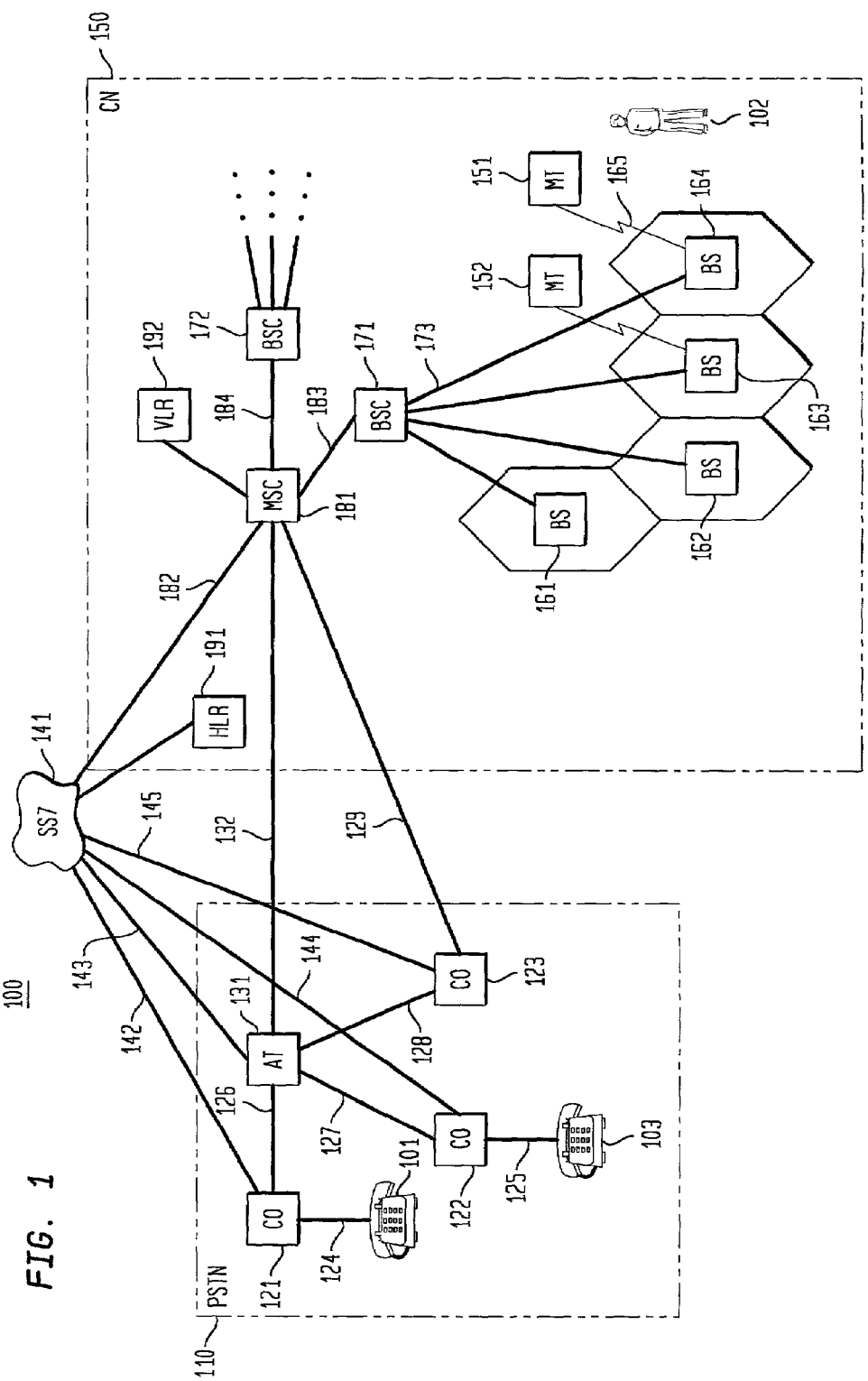
FIG. 1 is a high-level block diagram a network arrangement of a conventional public switched telephone network as well as an exemplary, conventional cellular network integrated with the public switched telephone network.

FIG. 1 depicts a high-level block diagram of an exemplary network infrastructure 100 composed of PSTN 110 and CN 150.

Public Switched Telephone Network

The exemplary PSTN 110 is composed of: (a) end central office (CO) 121 which is the serving office for user 101, and end central office 122 which is the serving office for user 103, and end central office 123; (b) access tandem (AT) office 131 connected to COs 121–123; and (c) Signaling System 7 (SS7) network 141 which is connected to COs 121–123 as well as AT 131 via channels 142, 144, 145, and 143, respectively, and which is used for call setup and call completion signaling messages. The conventional SS7 protocol is used for signaling messages processed and generated by SS7 network 141.

The interconnection of CO 121 to AT 131 via trunk 126 exemplifies the so-called two-level hierarchy of modern local access providers oftentimes referred to as local exchange carrier (LEC) service providers. CO 121 provides the basic access to the users of PSTN 110 in a predetermined geographical area; for instance, it is CO 121 which provides the basic "dial-tone" to subscribers/users of a given service provider. CO 121 may be directly linked to other end central offices (not shown) within the same local calling areas to handle "local" calls. On the other hand, "toll" calls are routed through AT 131 for transport to the LEC or an Interexchange Carrier (IC) depending upon the destination of the call. In the exemplary network of FIG. 1, COs 122 and 123 are presumed (without loss of generality but to simplify the description) to be within the same LEC as CO 121. (In general, COs 122 and 123 could be located anywhere within PSTN 110—from local to world-wide.)

The reasons for the existence of AT 131 are both historical and technical. Historically, so-called service areas known as local exchange and transport areas (LATAs) were established, and because LECs' business was confined to intraLATA operations, access tandems were created to serve as entry points in LATAs by the ICs. The import of this hierarchy on cellular network 150 will be discussed below. In addition, AT 131 provides more rigid transmission characteristics needed for "long distance" type calls.

COs 121–123 provide both line-side and trunk-side connections, whereas AT 131 provides only trunk-side connections, both for central offices and interexchange carriers. In brief, line-side connections (e.g., wire pairs 124 and 125) interface directly to the subscribers of a telephone service provided by COs 121 and 122. Trunk-side connections (e.g., trunks 126–128) couple switching facilities to each other. Each trunk 126–128 is composed, when required, of both trunks used for "talking paths" and trunks used for signaling. Again, the import of these types of connections will be further elucidated once CN 150 is introduced.

Signaling in PSTN 110 is dependent primarily upon whether the signaling is line-side or trunk-side. The signaling on the line side is typically associated with the circuit itself, namely, subscriber wire pair 124 coupling CO 121 with user 101 or wire pair 127 coupling CO 122 with user 103. Such signaling is usually in-band, meaning it uses the associated wire pair. Examples of in-band signaling include taking a telephone handset "off-hook", placing the handset "on-hook", "dialing" (e.g., keying digits on a telephone keypad using DTMF tones), "ringing" to alert a user of an incoming call, "flashing", that is, a momentary disruption in direct current supplied to a telephone on an established connection, and "in-band tone signaling" (e.g., DTMF tones). These types of functions are used in accordance with inventive aspects of the present invention. In general, there are a number of basic types of signaling elements, including addressing, supervisory, alerting, call progress, and control.

The type of signaling between central offices and access tandem offices uses a path distinct from the wire pair/voice path; such signaling arrangements are known as common channel signaling (CCS), with the SS7 signaling system being one well-known signaling system representative of CCS. The utility of CCS is that there is no need to establish a circuit path through PSTN 110 if a called party is not available (thereby freeing the circuit facilities for another call connection)—such information as called party availability can be established via the CCS, as provided by a "busy signal" on the called party's wire pair, or a "no answer" by the called party. The essential characteristics of CCS used in accordance with the present invention are discussed in detail at the point in the description in which the CCS is invoked.

To described a standard operating scenario, consider a PSTN-to-PSTN call. It is assumed that remote calling party R (in this example, user 101) initiates a telephone call to called party $U_f$ (in this example, user 103), where $U_f$ is assigned the fixed telephone number 908-555-1111. To establish this call, a signaling message generated by the call initiation actions of calling party R (going off-hook and dialing $U_f$'s telephone number) is launched by CO 121 to SS7 141 over signaling channel 142. In turn, SS7 141 processes the signaling message, and provides routing and signaling information for the call to CO 121, AT 131, and CO 122 over signaling channels 142–144 so that a call connection path can be established, in seriatim, over wire pair 124, CO 121, trunk 126, AT 131, trunk 127, CO 122, and wire pair 127 to called party $U_f$ whenever called party $U_f$ answers the incoming call ringing signal applied to wire pair 127. Assuming that a call has been established, COs 121 and 122 then monitor the established call for call completion, and upon detection of call completion (e.g., by both parties going on-hook), the established talking path is taken down.

Cellular Network 150

The exemplary CN 150 is composed of: (a) mobile terminals (MTs) 151 and 152, with MT 151 serving user ($U_c$) 102; (b) base stations (BSs) 161, 162, 163, and 164; (c) base station controllers (BSCs) 171 and 172; (d) mobile switching center (MSC) 181; and (e) home location register (HLR) 191 coupled to SS7 network 141 and visitor location register (VLR) 192 coupled to MSC 181. Focusing on MT 151, it is served by base station 164 as its home base station over radio channel 165, and user 102 of MT 151 is free to "roam" so that the user may be handled, in this example, by another base stations 161–163. Base stations 161–164 are connected to BSC 171 via trunks—trunk 173 is shown as connecting base station 164 to BSC 171. The primary purpose of each BSC 171 or 172 is to manage the radio resources of its associated base stations, such as by allocating radio channels or performing handoffs. BSC 171 and 172 home on MSC 181 via trunks 183 and 184, respectively. MSC 181 provides typical switching functions and coordinates location registration of base stations 161–164 and call delivery. MSC 181 is connected to AT 131 via trunk 132, which serves as the backbone communication network, to CO 123 via trunk 129, and to SS7 network 141, which serves as the signaling network to CN 150, via signaling channel 182.

Typically, MSC 181 is a special-purpose switch tailored for mobile applications, and can be viewed as having two ports, namely, a "wireline network" side and a "wireless network" side. On the wireline side, MSC 181 is connected to PSTN 110 with conventional trunking facilities 132 and 129, such as T1 trunk groups. Call set-up, call connection, and call completion between the CN 150 and the PSTN 110 are handled in a conventional wireline manner by viewing MSC 181 on the wireline side, for example, as a PSTN-like terminating central office. On the wireless side, MSC 181 provides the interface to base station controllers to effect wireless-wireless connections only involving CN 150, as well as wireless-wireline connections involving PSTN 110.

Thus, MSC 181 provides the telephony functions required for cellular mobile telephone operations and interfaces mobile terminals with PSTN 110. To reiterate, these functions include: (1) switching facilities for switching of voice channels to accomplish end-to-end conversations for fixed-to-cellular, cellular-to-fixed, and cellular-to-cellular; moreover, the switching facilities engender the handoff process to allow for continuous conversations as mobile terminals travel from cell site to cell site; (2) control and detection signaling to and from PSTN 110; (3) control and coordination of information and supervision signaling to mobile terminals; (4) control and coordination of call-processing activities for the mobile switching center and cell sites; (5) control of the links between the mobile switching center and the base stations; and (6) communication with the home location register and control of any associated visitor location register.

The following example covers the call setup, call establishment, and call tear-down of a PSTN-originated call from calling party R (user 101) to called party $U_c$ (user 102), assuming that $U_c$ is located in the area served by his/her home base station 164 so that $U_c$ is registered with the same information both in HLR 191 and VLR 192; moreover, $U_c$ is presumed to be served by cellular number 908-555-2222. Calling party R initiates a call by going off-hook and dialing $U_c$'s telephone number. CO 121 sends a signaling message to SS7 network 141 for processing; in turn, SS7 network returns signaling messages to CO 121, AT 131, and MSC 181 to establish a path, whenever $U_c$ answers an incoming ringing signal, including in seriatim: wire pair 124, CO 121, trunk 126, AT 131, trunk 132, MSC 181, trunk 183, BSC 171, trunk 173, base station 164, radio path 165, and mobile terminal 151.

PSTN-CN Interconnection

With reference to FIG. 1, AT 131 and MSC 181 are coupled via connection 132. In this technology art, this connection is known as a "Type 2A' connection which allows MSC 181 to connect to PSTN 110 like any other central office, such as COs 121–123. A Type 2A connection is a true trunk-side connection that employs trunk signaling protocols.

MSC 181 also connects to CO 123 via connection 129; this type of connection is a so-called Type 1 connection, which has characteristics of both line-side and trunk-side connections. In essence, the Type 1 connection is a trunk-side connection to a central office that uses trunk signaling protocols in conjunction with a feature generically called "trunk with line treatment" (TWLT). Basically, the TWLT feature allows the end office to combine some line-side and trunk-side features; for example, while trunk-side signaling protocols are used, a call is recorded for billing purposes as if the call was made by a line-side connection. In addition, the use of TWLT enables the central office switch to return answer supervision to MSC 181. Using a Type 1 connection, MSC 181 can access any valid telephone number. The full import of depicting CO 123 as being connected to MSC 181 by a Type 1 connection will be detailed shortly.

Typically, a Type 2A connection or a Type 1 connection uses a four-wire circuit for two-way communications, that is, transmit and receive, as well as E&M supervision well-known in the art.

Network Management Functions of CN 150

In the fixed-to-cellular phone call example above, it was assumed that $U_c$ was located in his/her home serving region. One major function of MSC 181 is to control the tracking of a user as the user roams throughout CN 150, and beyond to other cellular network providers. Network management functions of CN 150, such as call processing and location registration, are achieved by the exchange of signaling messages through SS7 network 141.

One standard location management technique to register MT 151, both in its home region as well as when the user of MT 151 roams, is based on a two-level data hierarchy such that the two types of databases—HLR 191 and VLR 192—are invoked in tracking a mobile terminal. In this example, user of MT 151 is presumed to be permanently associated with HLR 191 (there may be other HLRs homing on SS7 network 141 as accessed by users of the services of other cellular providers). Information about each user, such as the types of services subscribed to, billing information, and location information, is stored in a user profile located in HLR 191. Generally, there may be a plurality of visitor location registers, and their placement may vary among service providers. In this example, VLR 192 is shown as being associated with MSC 181. VLR 192 stores the information about MTs 151 and 152, as well as other mobile terminals not shown (as downloaded from HLR 191) visiting the geographical region served by VLR 192.

Location Registration

In order to correctly deliver a call, CN 150 must keep track of the location of each mobile terminal. As a user of MT 151 moves around the coverage area of CN 150, data stored in HLR 191 and VLR 192 may no longer be accurate. To ensure that calls can be delivered successfully, an update technique must be applied—the process is called location registration. Locations registration is initiated by MT 151 when it reports its current location to CN 150. One conventional cellular network arrangement, discussed for expository purposes, adopts the approach such that the coverage area of CN 150 is partitioned into registrations areas (RAs), and each mobile terminal performs a location update when it enters a new RA. Each RA includes a number of cells and, in general, all base stations belonging to the same RA are connected to the same MSC.

When a mobile terminal enters a RA, if the new RA belongs to the same VLR as the old RA, the record of the VLR is updated to record an identifier (ID) on the new RA. Otherwise, if the new RA belongs to a different VLR, a number of extra steps are required to: (a) register the mobile terminal at the new serving VLR; (b) update the HLR to record the ID of the new serving VLR; and (c) de-register the mobile terminal at the old serving VLR.

To give a concrete example of this process, the following is a list of tasks that are performed during location registration:

(i) MT 151 enters the new RA and transmits a location message to the new base station. In FIG. 1, suppose one registration area encompasses BSs 161 and 162, and a second registration area encompasses BSs 163 and 164. Thus, when MT 151 moves from the cell covered by BS 164 to the cell covered by BS 163, a registration boundary has been crossed.

(ii) new BS 162 forwards the location update message through BSC 171 to MSC 181, which launches a registration query to its associated VLR 192; and (iii) VLR 192 updates its record on the location of MT 151 to complete location registration.

Call Delivery

Two major steps are involved in call delivery, namely, determining the VLR of the called MT, and locating the visiting cell for the called MT. Locating the serving VLR of the serving MT involves the following lookup procedure, assuming the calling MT is MT 151 and the called MT is MT 152:

(i) calling MT 151 sends a call initiation signal to MSC 181 through BS 164 and BSC 171;

(ii) MSC 181 determines the address of the HLR of called MT 152 by table lookup procedure called global title translation, and sends a location request message to the HLR. In the network of FIG. 1, there is only one HLR 191, so HLR 191 is identified as the address of the HLR associated with MT 152;

(iii) HLR 191 determines the serving VLR of called MT 152 and sends a route request message to this serving VLR. In the network of FIG. 1, there is only one VLR 192, so VLR 192 then forwards the message to MSC 181 serving VLR 192;

(iv) MSC 181 allocates a temporary identifier to MT 152 and sends a reply to HLR 191 together with the temporary identifier;

(v) HLR 191 returns this information to MSC 181 of calling MT 151; and (vi) MSC 181 initiates a call setup based upon the VLR information of called MT 152. (Note: in a more complex network than depicted by FIG. 1, wherein there is a MSC associated with the MT 151 and another MSC associated with MT 152, then a call setup between the two MSCs is requested via SS7 network 141.)

Overview in Accordance with Present Invention

Operation from User's Perspective

A user who subscribes to the Cellular-Fixed Call Transfer Service (CFCTS) in accordance with the present invention must have his/her cellular network provider assign a new number, say $N_{fc}$, to the user. With reference to FIG. 1, it is now assumed that a user of CFCTS, previously identified by reference numerals 102 and 103 to distinguish separate parties generally, are now the same party (referred to as user 102–3), that is, user 102–3 has both a fixed phone served by PSTN 110 (e.g., CO 122 and wire pair 125) and a cellular phone served by CN 150 (e.g., MT 151 coupled by radio channel 165 to BS 164). Calls made to $N_{fc}$ will be received by user 102–3 on his/her fixed telephone while those made $N_c$ will still be received on his/her cellular telephone. User 102–3 must still subscribe to the fixed network service from the local access provider and keep $N_f$ active. Although user 102–3 can receive calls made to $N_f$ on his/her fixed telephone, these calls cannot be transferred to his cellular telephone. Therefore, from user 102–3's perspective, it is better to receive all calls to the fixed telephone on $N_{fc}$ instead of $N_f$. This can be accomplished by keeping $N_f$ private and using $N_{fc}$ and $N_c$ as user 102–3's telephone numbers made known to the public.

In addition, the cellular network provider gives user 102–3 a special access number, say $N_a$, for use in making outgoing calls. Whenever the user wants to make a call from either the fixed or the cellular telephone, he/she first dials $N_a$. User 102–3 user is then be prompted to dial the telephone number to be called. A call is then established to the desired telephone number.

To transfer an on-going call from either the fixed telephone to the cellular telephone or vice versa, user 102–3 initiates a call transfer signaling action, such as keying in a tone sequence using touch-tone keys, i.e., DTMF tones. When the other, nearby telephone rings, user 102–3 picks up and resumes the conversation.

Implementation Details

The key constraint in implementing CFCTS as described below is effecting a service which is completely transparent to the local access provider. However, if the cellular service provider and local service provider are the same entity, the methodology is also transparent to the coalescing of the providers.

Figure 2:
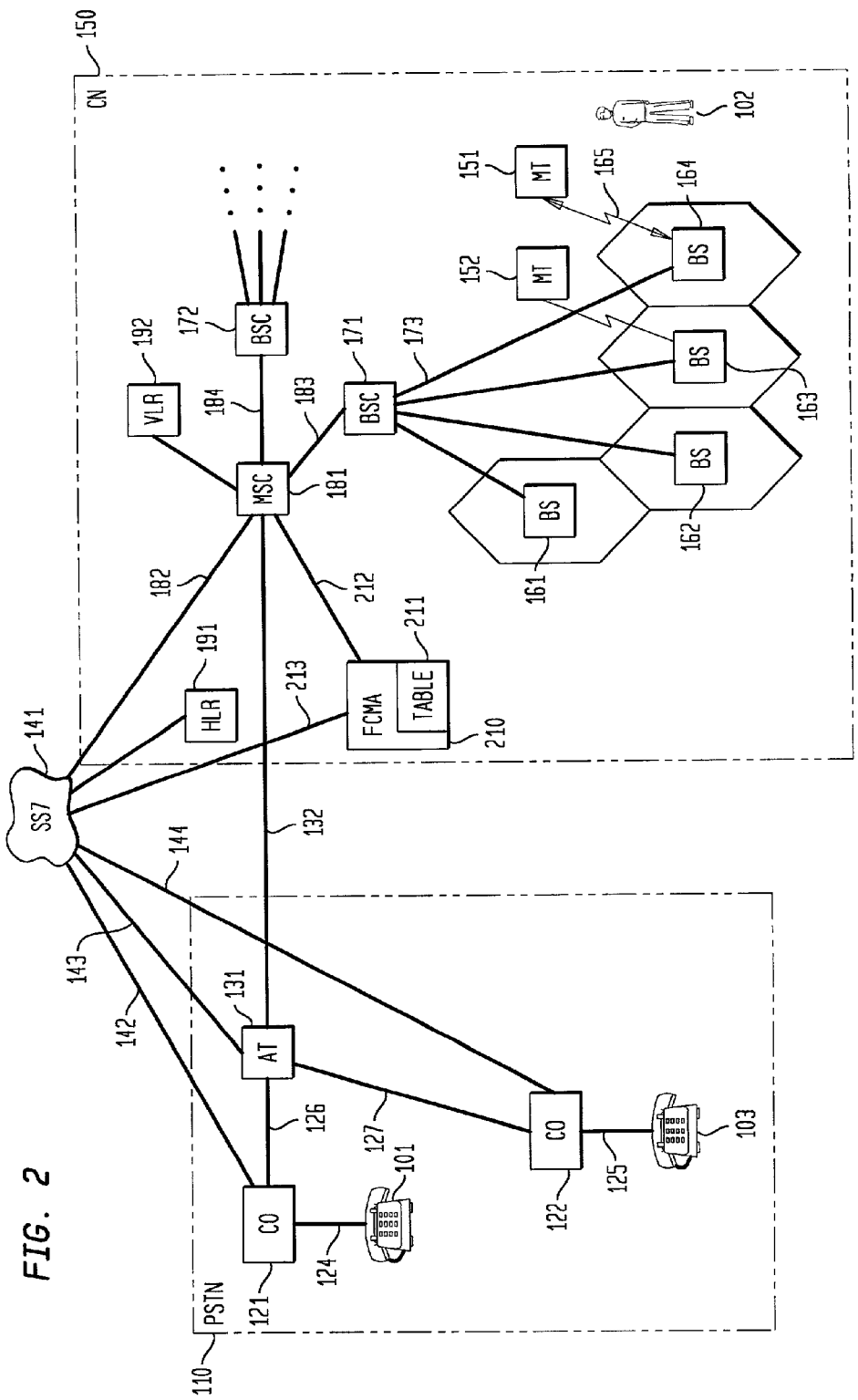
FIG. 2 is a high-level block diagram of the Fixed-Cellular Mobility Agent (FCMA) in accordance with the present invention network arrangement shown incorporated into the arrangement of FIG. 1.

The following discussion references FIG. 2, which is essentially the network arrangement of FIG. 1 with an interposed intelligent agent, referred to as the Fixed Cellular Mobility Agent (FCMA) 210, cooperatively arranged with MSC 181 to handle the functions related to CFCTS. Each mobile switching center in the cellular network now has an associated FCMA.

FCMA 210, for purposes of the immediate discussion, is presumed to be a PSTN-type central office. To accomplish this in a practical sense, one can visualize CO 123 in FIG. 1 being been re-located to CN 150 and re-named FCMA 210. Accordingly, trunk 212 (formerly trunk 129) is a Type 1 connection and signaling trunk 213 (formerly trunk 145) connects to SS7 network 141. In all respects, FCMA 210 of FIG. 2 functions like a PSTN central office, complete with switching and signaling functionalities.

In addition, the cellular network provider of CN 150 maintains a lookup table 211 as a data structure in FCMA 210 which identifies the three telephone numbers $N_f$, $N_c$, and $N_{fc}$ (e.g., from the discussions above, 908-555-1111, 908-555-2222, and as used later, 908-555-3333, respectively) for every user who has subscribed to CFCTS. Table 211 for a particular user can also be maintained as part of the user profile in the Home Location Registry (HLR). For clarity of presentation, this table is referred to as CFCTS-table 211 and it is assumed to be part of FCMA 210 for the expository purposes.

In the following sections, the actions required to implement CFCTS for several different scenarios are described. In the descriptions, the focus is on a particular user (U now in place of user 102–3) who has subscribed to CFCTS.

1.1 Incoming Call to $N_{fc}$

Figure 3:
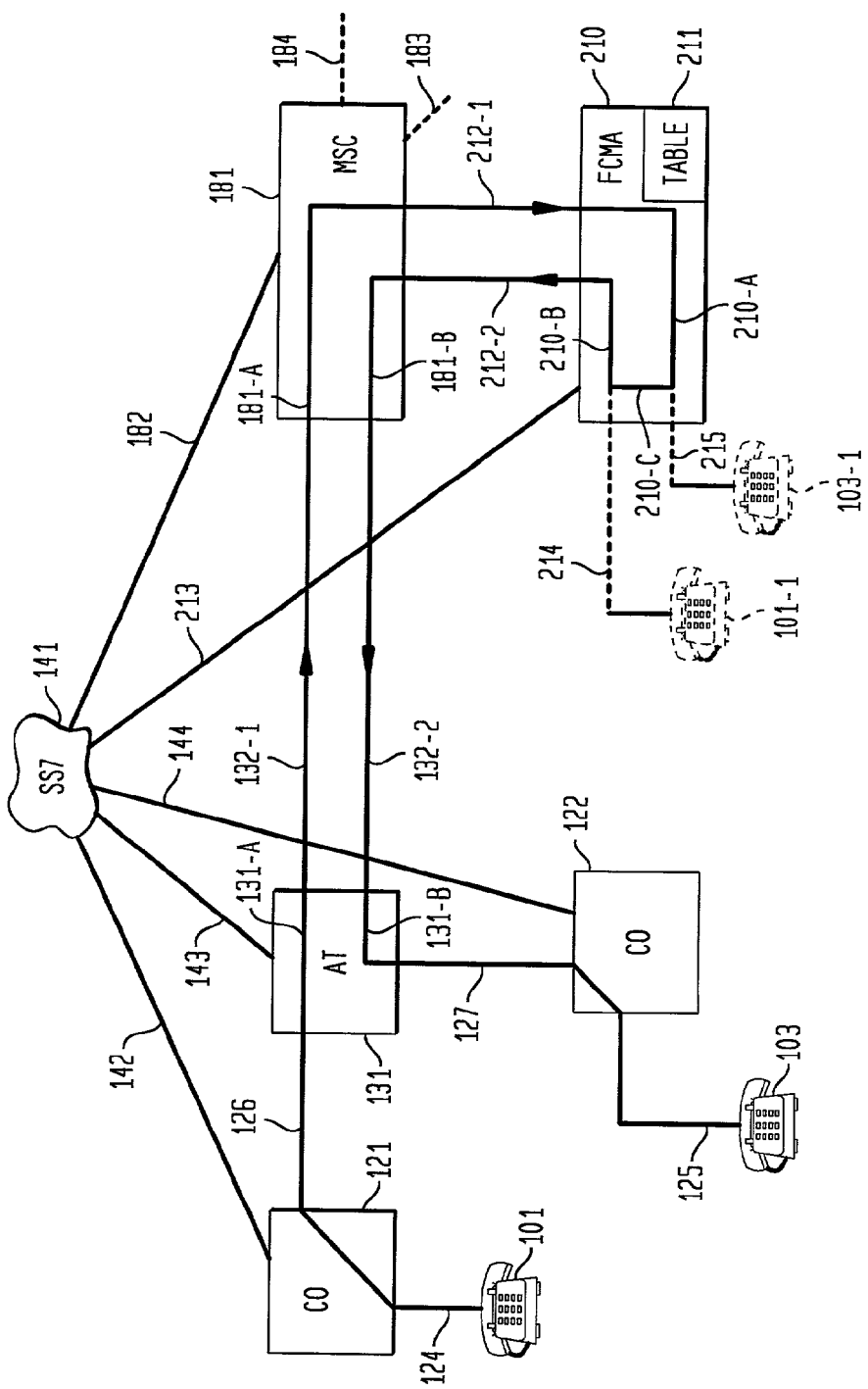
FIG. 3 depicts in more detail certain elements of FIG. 2, including the call connections for completing a call from a calling party on the fixed network to a called party on the fixed network in accordance with the present invention.

Reference is now made to FIG. 3, which shows the pertinent sub-components of FIG. 2 in some detail, to describe the operation of FCMA 210 in completing a call from calling party 101 (R) to called party 103 (U). R keys in $N_{fc}$ (e.g., 908-555-3333) to call U. The circuit arrangement in accordance with the present invention is such that CO 121, in a network sense, treats FCMA 210 as the central office serving U based upon the assigned $N_{fc}$, whereas U is actually served by CO 122. CO 121 sends a call setup signaling message to SS7 141 which processes the signaling message to arrange for a call connection path composed of, in seriatim: wire pair 124, CO 121, talking trunk 126, AT 131, talking trunk 132-1, MSC 181 (including switching point 181-A), talking trunk 212-1, and FCMA 210 (including switching point 210-A)—this path is designated $C_R$ in the sequel. User 103-1, shown in phantom connected to FCMA 210, is the surrogate for U (user 103). (It is as if user 103-1 is assigned an equipment location in FCMA 210, but there is no wire pair connected to the line side of the equipment to complete a call.)

FCMA 210, upon detecting the incoming call to $N_{fc}$, now acts as a calling party by initiating a call to U via a look-up in table 211 to obtain $N_f$. FCMA 210 is, in a logic sense, acting as a surrogate to R by placing the call to $N_f$. This call initiation action is indicated by showing user 101-1, in phantom, as the logical initiator of the call to $N_f$. FCMA 210 initiates a call setup message to SS7 141 to set-up a call path when U answers the call to $N_f$, the path being composed of, in seriatim: FCMA 210 (including switching point 210-B), talking trunk 212-2, MSC 181 (including switching point 181-B), talking trunk 132-2, AT 131 (including switching point 131-B), trunk 127, CO 122, and wire pair 125—this path is designated $C_U$ in the sequel.

When U answers the incoming call to $N_f$, U's call-answer is detected by FCMA 210 acting in its surrogate capacity as user 101-1. Then FCMA 210 answers the incoming call on $N_{fc}$ as the call-answering surrogate to user 103-1. Now FCMA can bridge R to U by closing switching point 210-C to interconnect switched points 210-A and 210-B. In practice, one way to accomplish this bridging function is to bridge the equipment location associated with surrogate 103-1 to the equipment location associated with surrogate 101-1.

From R's viewpoint, the call to U has been transparent in terms of the additional call set-up and talking path routing, and R is unaware that U may be at a location different than the surrogate of U that is served by FCMA 210.

Figure 4:
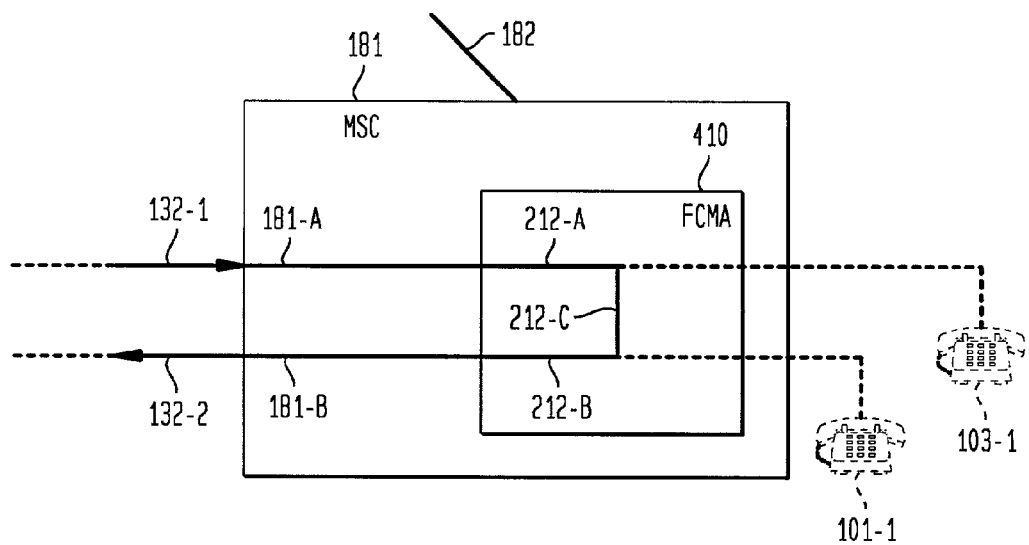
FIG. 4 depicts an arrangement equivalent in operation to the arrangement of FIG. 3 wherein the FCMA is co-located with the mobile switching center.

While the foregoing description of FIG. 3 is helpful in visualizing the manner in which a call to U is completed in terms of conventional PSTN and CN elements, it is apparent that it is possible to co-locate FCMA 210 with MSC 181 for increased efficiency by reducing the use of trunk facilities and switching points. Such a co-located arrangement for FCMA 210 is shown in FIG. 4, and is now referred to by reference numeral 410 to evidence the co-located nature of the Fixed-Cellular Mobility Agent. FCMA 410, in this embodiment, is implemented essentially in software which may be an applique to the generic program executing MSC 181. Basically, FCMA 410 has the characteristics of an embedded central office, meaning trunk-side properties when interfaced with the standard functionality of MSC 181, and line-side properties when interfaced to the surrogates of calling and called parties.

Figure 5:
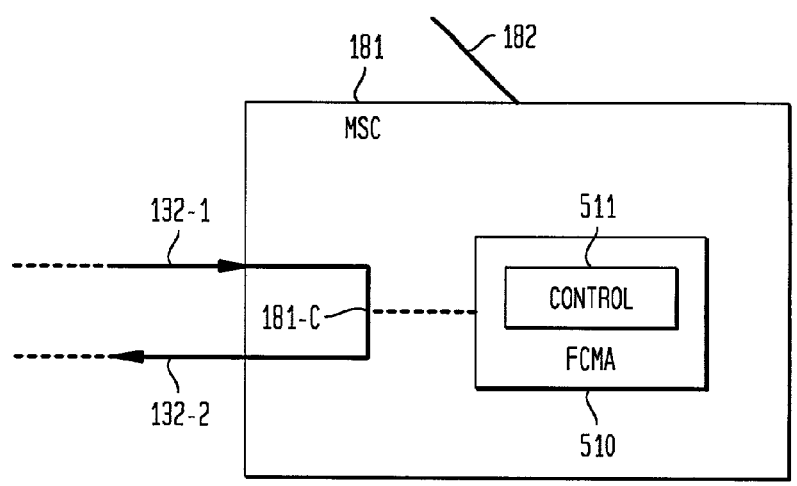
FIG. 5 depicts a preferred arrangement of the FCMA which is fully integrated into the structure and operation of the mobile switching center.

From the arrangement of FIG. 4, it is further apparent that even more efficiencies can be realized if FCMA 410 is integrated with MSC 181 so as to control the switching action of MSC 181 to eliminate unnecessary switching points; such an arrangement is shown in FIG. 5, wherein the FCMA is now identified by reference numeral 510 to highlight the added functionality. In particular, FCMA 510 is arranged with control function 511 which controls switching point 181-C to cross-connect incoming talking trunk 132-1 from R with outgoing talking trunk 132-2 to U.

(In the following, "H-MSC" designates the mobile switching center serving closest to U's home location.) Broadly, to reiterate the operating characteristics of FCMA 510, user U is assigned the telephone number $N_{fc}$ by the cellular network provider for receiving calls on U's fixed telephone. $N_{fc}$ for U is chosen such that PSTN 110 routes the call to the H-MSC from calling party R. From the entry for U in CFCTS-table 211, the H-MSC's FCMA 510 determines the telephone number $N_f$ of U. FCMA 510 then initiates a call to $N_f$ via the H-MSC. This call will be routed through PSTN 110 to the user's fixed telephone. When U answers the phone, FCMA 510 then, in effect, answers the call made to $N_{fc}$, and directs that the H-MSC, in turn, establishes a call path, via the switching capabilities of the H-MSC, to U's fixed telephone.

It is noted now that, in addition, FCMA 510 also monitors $C_U$ to detect if U wants to transfer the call to his/her cellular telephone. Recall, for example, that the user can communicate this intention by dialing a DTMF sequence. The actions taken by FCMA 510 to complete the transfer are discussed shortly.

Figure 6:
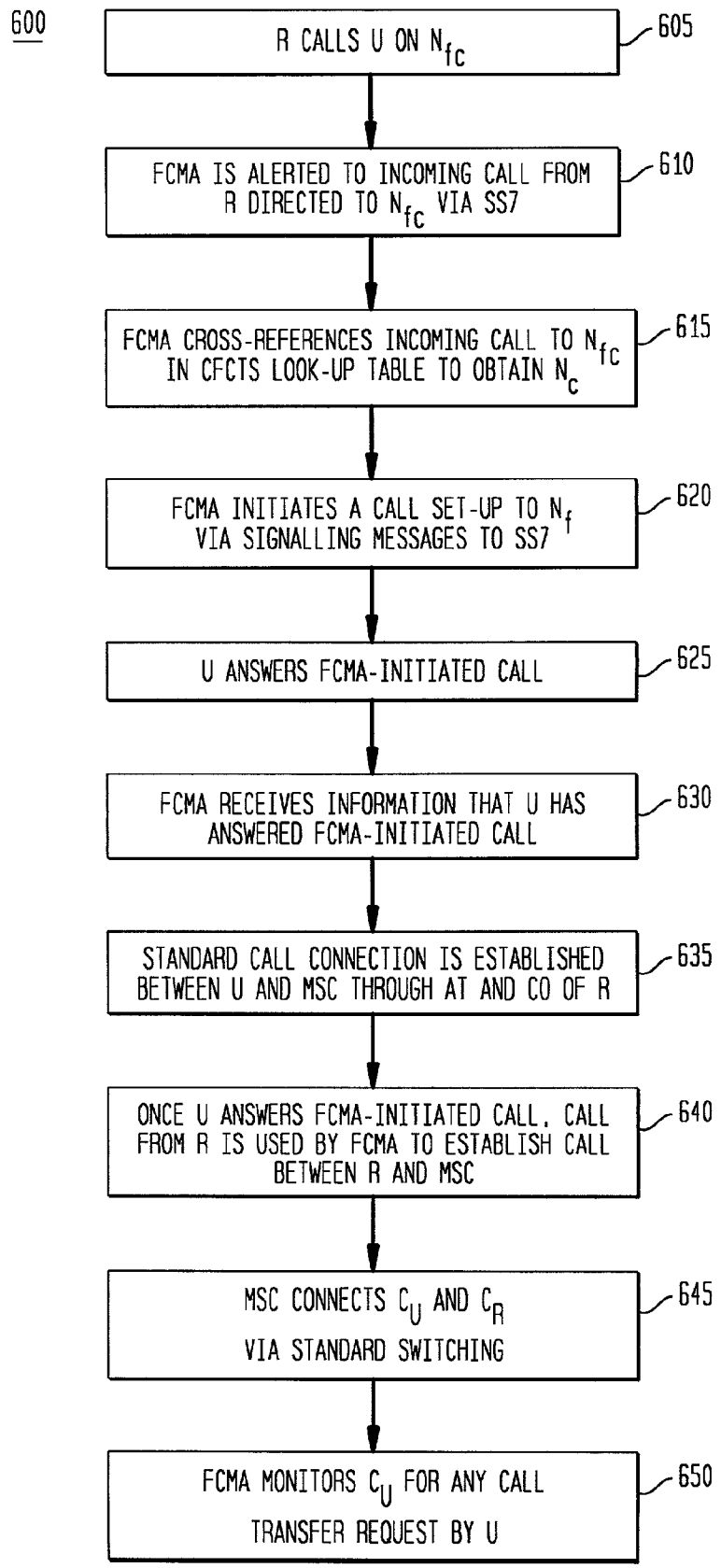
FIG. 6 is a flow diagram for processing a call to a called party on a fixed network using the CFCTS service in accordance with FIGS. 2–5.

Summary of the Flow of a Call from R to U Via $N_{fc}$:

With reference to flow diagram 600 of FIG. 6, the program flow effected by FCMA 510 is as follows (note that the telephony-type functionality required of FCMA 510 is shown in parentheses after each step):

1.) block 605—R calls U on $N_{fc}$ (908-582-3333) via R's CO 121
2.) block 610—FCMA is alerted to incoming call from R directed to 908-555-3333 via standard SS7 signaling
   (signaling)
3.) block 615—FCMA cross-references incoming call to 908-555-3333 in CFCTS look-up table to obtain N of 908-555-1111
4.) block 620—FCMA initiates a call set-up to 908-555-1111 via signaling messages to SS7 network
   (call initiation)
5.) block 625—U answers FCMA-initiated call, e.g. by picking up handset
6.) block 630—FCMA receives information that U has answered FCMA-initiated call
   (call answered)
7.) block 635—Standard call connection $C_U$ is established between U and MSC through AT 131 and CO 122 by U answering incoming call
8.) block 640—Once U answers the FMCA-initiated call, the incoming call from R to FCMA is used by FCMA to establish a call connection $C_R$ established between R and MSC via AT 131 and CO 121
   (call answering)
9.) block 645—MSC connects $C_U$ and $C_R$ via standard switching to complete of the overall path between R and U
   (switching)
10.) block 650—FCMA monitors $C_U$ to detect call transfer request by U, if any
   (call monitoring, e.g., by a pattern of DTMF digits)

1.2 Transfer of Incoming call to $N_{fc}$

Figure 7:
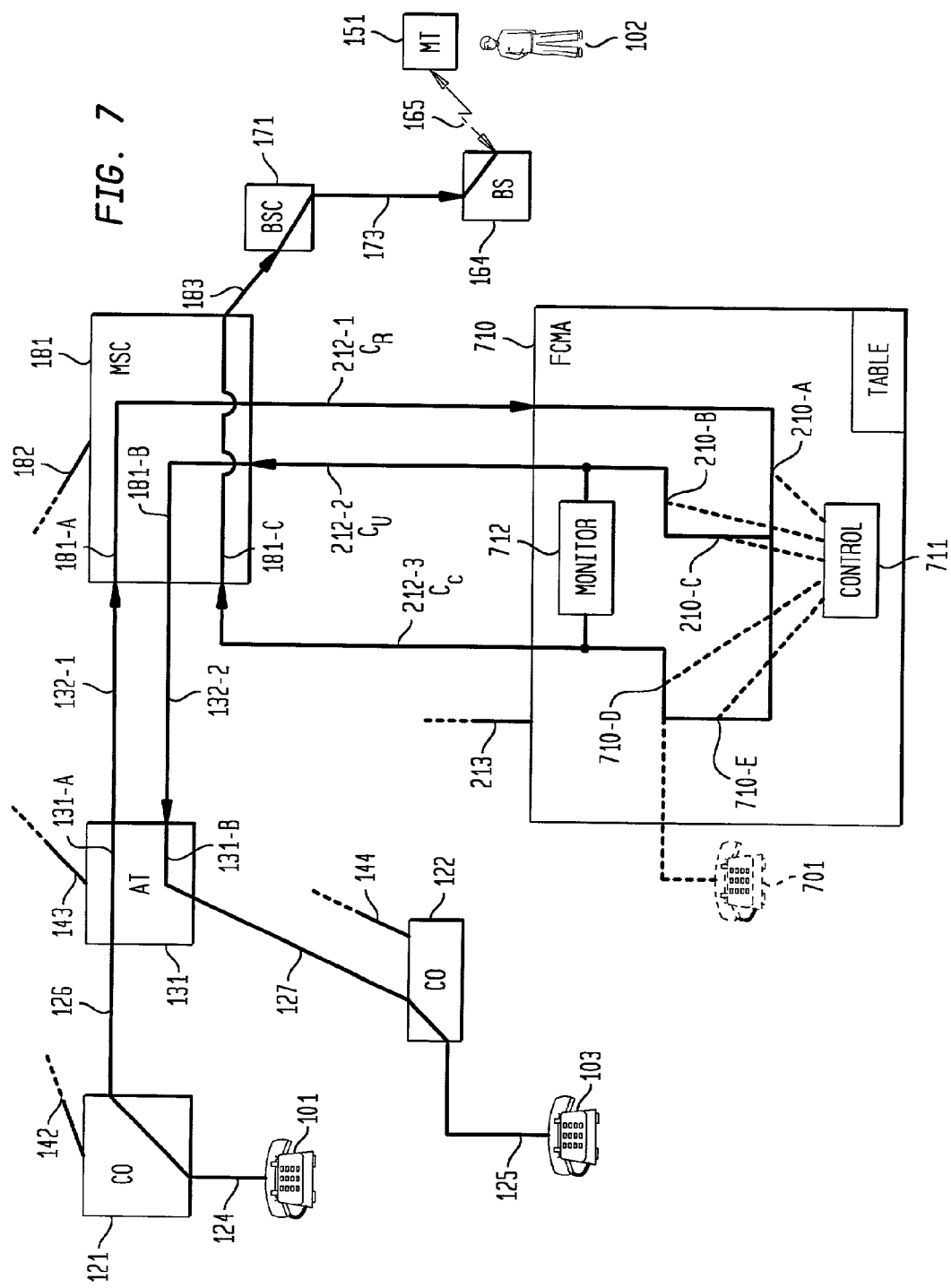
FIG. 7 depicts an illustrative arrangement for transferring an established incoming call from the fixed network to the cellular network.

It is now supposed that user U desires to transfer the already established incoming call to $N_{fc}$ from party R to his/her cellular telephone/mobile terminal 151 from his/her fixed telephone 103. The arrangement for accomplishing the desired transfer is shown in FIG. 7. The starting point for the description of FIG. 7 is the call completion description of the arrangement of FIG. 3, which has been redrawn in FIG. 7 along with the overlay required to effect the desired transfer. In particular, original talking paths $C_R$ and $C_U$ are shown connected via FCMA 710. Now, in addition, FCMA 710 includes monitor circuit 712 to monitor that part of talking path $C_U$ emanating from FCMA 710, namely, path 212-2, and switching point controller 711 to open/close switching points to incoming/outgoing talking paths. Whenever monitor circuit 712 detects U's desire to transfer the established incoming call, for instance by detecting a sequence of DTMF tones (e.g., *1#1) on path 212-2, FCMA 710 acts as a surrogate call initiator by dialing the U's telephone number $N_c$ as a conventional cellular network-type call. This is shown in FIG. 7 wherein surrogate user 701 dials $N_c$ through switching point 710-D as closed by controller 711. When U answers cellular telephone 151, which is presumably at the same physical location as user U, a new talking path is established from FCMA 710 to MT 151, the new path being composed of talking path 212-3, MSC 181 via switching point 181-C, trunk 183, base station controller 171, talking path 173, base station 164, and radio path 165—this connection is denoted $C_C$. Once talking path $C_C$ is established, then (a) controller 711 closes switching point 710-E to bridge talking path $C_C$ to talking path $C_R$, and (b) controller 711 opens switching points 210-B and 210-C so that talking path $C_U$ may be torn down by the usual call termination procedures.

It is noted that now U's fixed phone 103 is again available for receiving another incoming call and, moreover, since monitor circuit 712 now monitors talking path 212-3, it is possible to re-transfer a connection between user U's fixed telephone and U's cellular telephone—this is discussed in more detail in section 2.2 below after the discussion of section 2.1 below.

Summary of the Flow of a Transfer from $C_U$ to $C_C$

Figure 8:
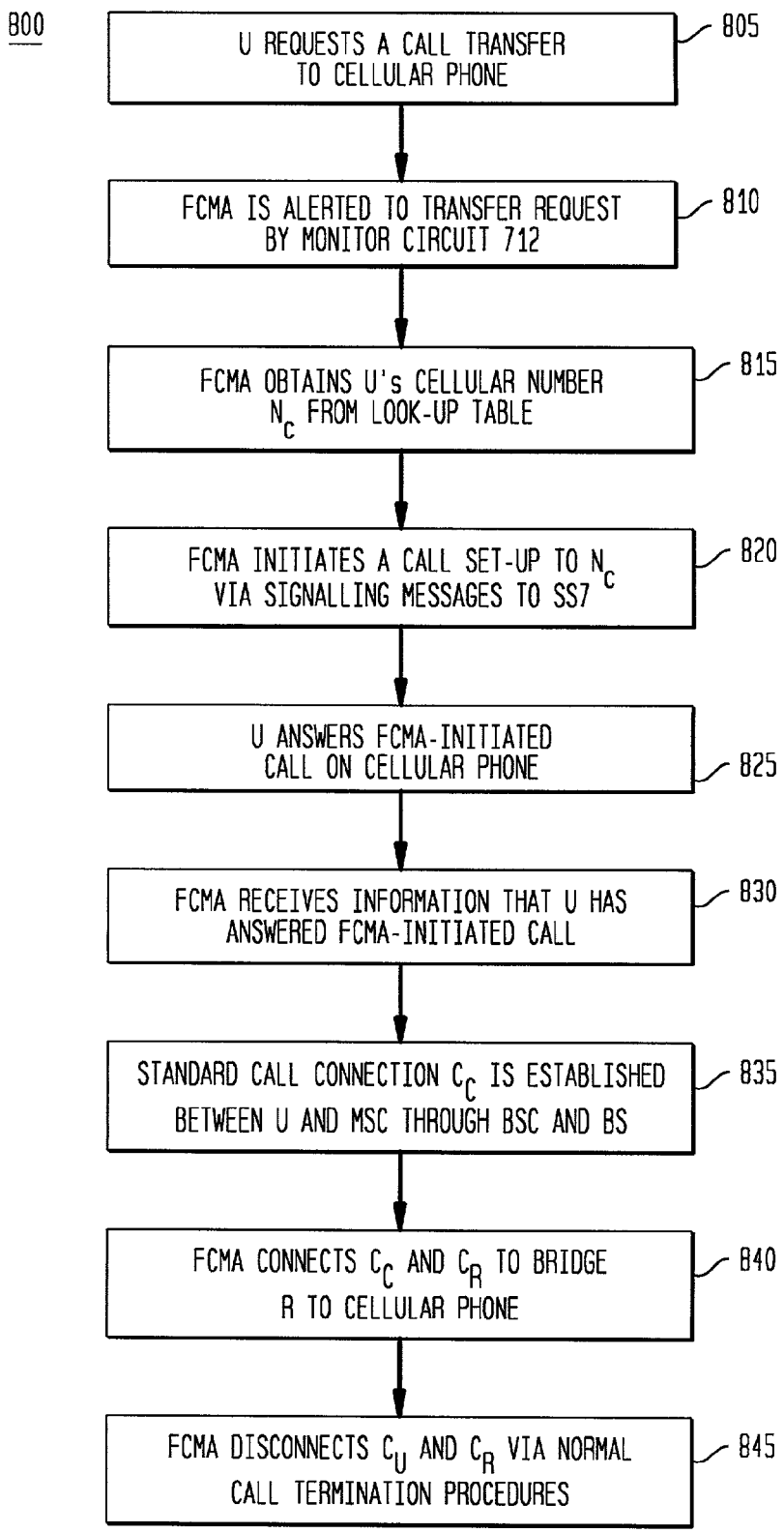
FIG. 8 is a flow diagram for processing the transfer of an established incoming call from the fixed network to the cellular network.

With reference to flow diagram 800 of FIG. 8, the program flow effected by FCMA 710 for call transfer is as follows (note that the telephony-type functionality required of FCMA 710 is shown in parentheses after each step):

1.) block 805—U requests a call transfer to cellular phone
   (monitoring)
2.) block 810—FCMA is alerted to call transfer request by monitor circuit 712
3.) block 815—FCMA obtains U's cellular number $N_c$ (908-555-2222) in CFCTS look-up table
4.) block 820—FCMA initiates a call set-up to 908-555-2222 via signaling messages to SS7 network
   (call initiation)

5.) block 825—U answers FCMA-initiated call by answering cellular telephone
6.) block 830—FCMA receives information that U has answered FCMA-initiated call
   (call answered)
7.) block 835—Standard call connection $C_C$ is established between FCMA and BS through MSC by U answering incoming call
8.) block 840—FCMA connects $C_C$ and $C_R$ to bridge call from R to cellular phone
   (switching)
9.) block 845—FCMA disconnects $C_U$ from $C_R$ via switching to tear down of the established connection between R and U on the fixed network
   (switching)

2.1 Incoming call to $N_c$

When a third party on the fixed network, such as party 101 of FIG. 1 (again designated party R for Remote), wants to call user 102 on his/her cellular telephone/mobile terminal 151, party R uses the telephone number $N_c$ (e.g., 908-555-2222). If user 102 is NOT a subscriber to the CFCTS, this incoming call will be routed by the public switched telephone network 110 and the cellular network 150 to cellular telephone 151 in the conventional manner as discussed above with respect to FIG. 1. If user 102 is located within his/her home registration area, this call will go through the user 102's H-MSC (181 in FIG. 1) via the call registration and call delivery processes effected by HLR 191. If the user 102 moves from a registration area outside his/her home area into his/her home registration area while the call is in progress, the call will be handed over to the H-MSC as part of the routine handovers in cellular networks, that is, by the call registration, delivery, and handoff procedures effected by the interplay of HLR 191 and VLR 192.

Figure 9:
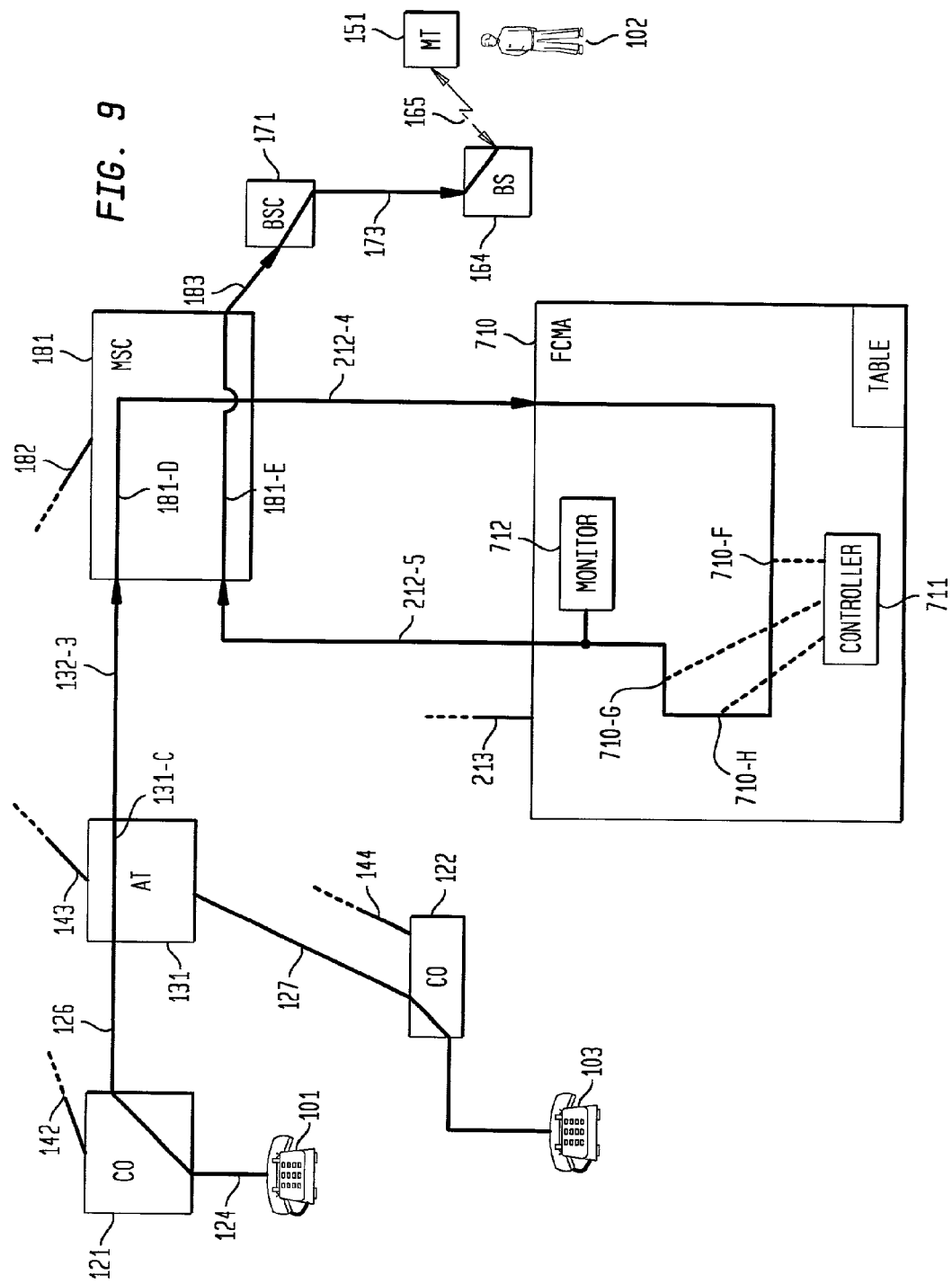
FIG. 9 depicts an illustrative arrangement for completing an incoming call from a remote calling party to the cellular network.

However, if user 102 (now U) is a subscriber of CFCTS, the cellular service provider of cellular network 150 knows U is a subscriber (e.g., by contents of the CFCTS-table) and handles the incoming call to $N_c$ by invoking, in one illustrative arrangement, the processing effected by the FCMA, first discussed with respect to FIG. 3, further described with respect to FIG. 7, and as now further described with reference to FIG. 9. In the arrangement of FIG. 9, a call set-up and call completion procedure similar to the call set-up and call completion procedure of FIG. 3 is effected when R calls U, the difference being that R now calls U at $N_c$ rather than $N_{fc}$. Thus, FMCA 710 of FIG. 9 acts as a called party surrogate to process the incoming call by R, and as a calling party surrogate to initiate an outgoing call to U at his/her cellular phone 151. The components of FIG. 9 depict the final call connection result wherein R is connected to U via two talking paths. The first path (again called $C_R$) includes in series: talking path 124, CO 121, talking trunk 126, AT 131 including switching point 131-C, talking trunk 132-3, MSC 181 including switching point 181-D, and talking trunk 212-4. The second path (again called $C_C$) includes in series: talking trunk 212-5, MSC 181 including switching point 181-E, trunk 183, BSC 171, trunk 173, BS 164, and radio path 165. In FCMA 710, the two talking paths are bridged via switching points 710-F, 710-G, and 710-H.

Figure 10:
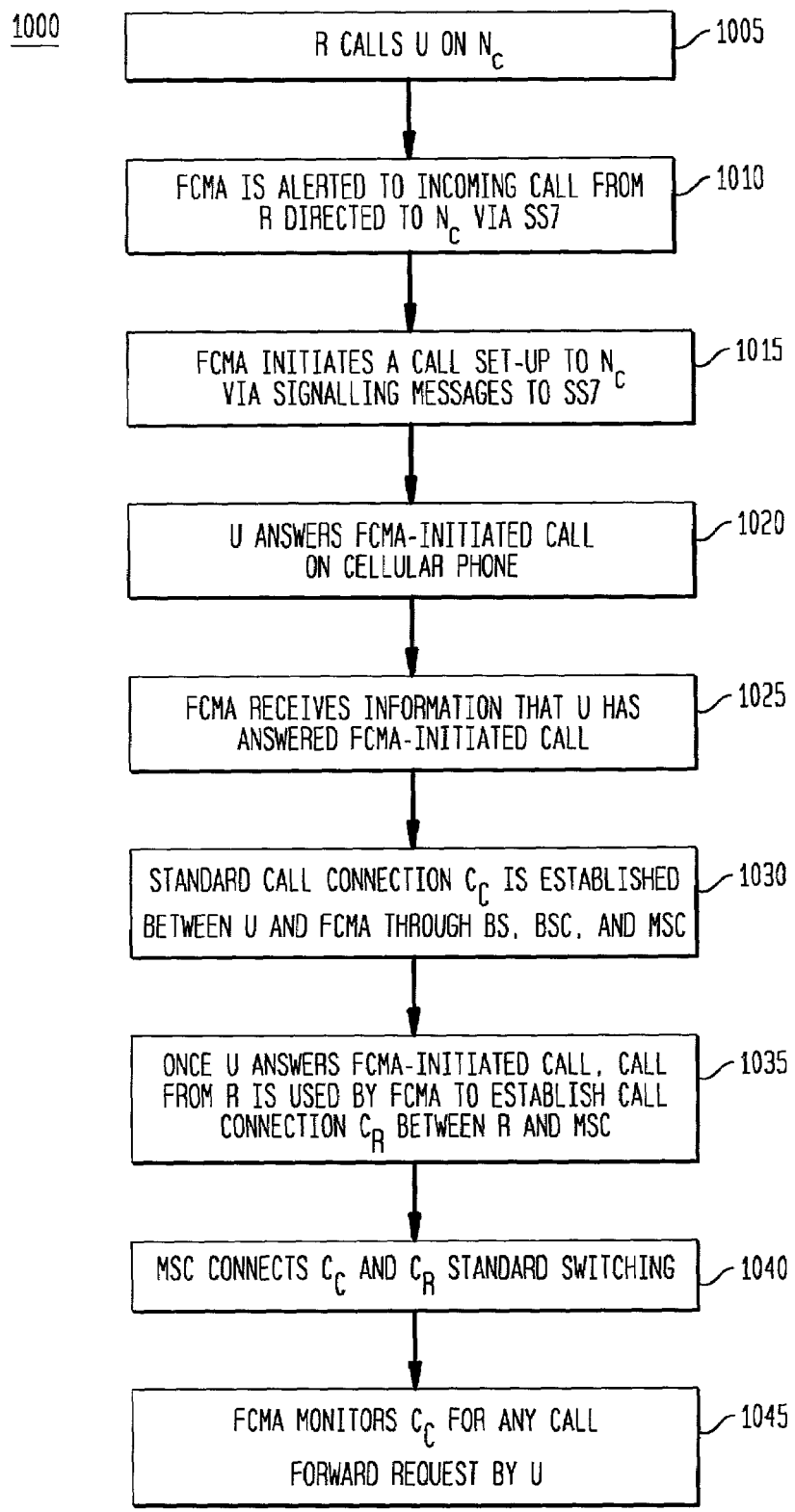
FIG. 10 is a flow diagram for processing a call to a called party on a cellular network using the CFCTS service in accordance with FIG. 9.

Summary of the Flow of a Call from R to U Via $N_c$:

With reference to flow diagram 1000 of FIG. 10, the program flow effected by FCMA 710 is as follows (note that the telephony-type functionality required of FCMA 710 is shown in parentheses after each step):
1.) block 1005—R calls U on $N_c$ (908-582-2222) via R's CO 121
2.) block 1010—FCMA is alerted to incoming call from R directed to 908-555-2222 via standard SS7 signaling
   (signaling)
3.) block 1015—FCMA initiates a call set-up to 908-555-2222 via signaling messages to SS7 network
   (call initiation)
4.) block 1020—U answers FCMA-initiated call, e.g. by pressing "ON" of cellular telephone
5.) block 1025—FCMA receives information that U has answered FCMA-initiated call
   (call answered)
6.) block 1030—Standard call connection $C_C$ is established between U and FCMA through BS 164, BSC 171, and MSC 181 by U answering incoming call
7.) block 1035—Once U answers the FMCA-initiated call, the incoming call from R to FCMA is used by FCMA to establish a call connection $C_R$ established between R and FCMA via MSC 181, AT 131, and CO 121
   (call answering)
8.) block 1040—FCMA connects $C_C$ and $C_R$ via standard switching to complete the overall path between R and U
   (switching)
9.) block 1045—FCMA monitors $C_C$ to detect call transfer request by U, if any
   (call monitoring, e.g., by a pattern of DTMF digits)

(It is noted that, in another illustrative embodiment, FCMA 710 may be merged with MSC 181 in the same manner described with respect to FIGS. 4 and 5. One advantage of the arrangement of FIG. 9, from a deployment perspective, is that FCMA 710 is a stand-alone central office-like facility which may deployed as an adjunct to the conventional network with minimal impact, that is, without the need to modify components, such as MSC 181, of the conventional network.)

2.2 Transfer of Incoming call to $N_c$

Figure 11:
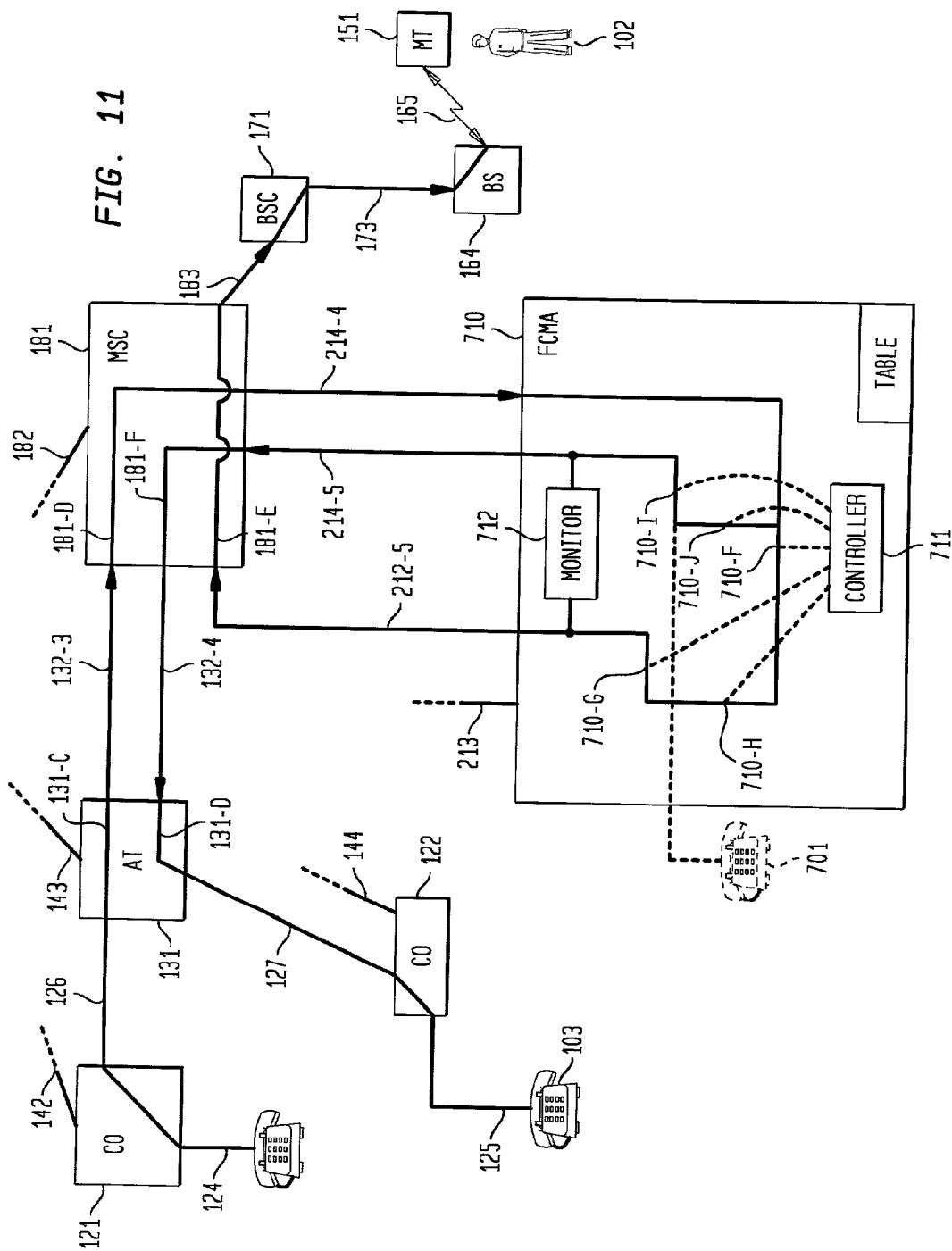
FIG. 11 depicts an illustrative arrangement for transferring an established incoming call from the cellular network to the fixed network.

It is now supposed that user U desires to transfer the already established incoming call to $N_c$ from party R to his/her fixed telephone 103 from his/her cellular telephone/mobile terminal 151. The arrangement for accomplishing the desired transfer is shown in FIG. 11. The starting point for the description of FIG. 11 is the call completion description of the arrangement of FIG. 9, which has been redrawn in FIG. 11 along with the overlay required to effect the desired transfer. In particular, original talking paths $C_R$ and $C_C$ are shown connected via FCMA 710. Now monitor circuit 712 monitors that part of talking path $C_C$ emanating from FCMA 710, namely, path 212-5. Whenever monitor circuit 712 detects U's desire to transfer the established incoming call, for instance by detecting a sequence of DTMF tones (e.g., *1#1) on path 212-5, FCMA 710 acts as a surrogate call initiator by dialing the U's telephone number $N_f$ as a fixed network-type call. This is shown in FIG. 11 wherein surrogate user 1101 dials $N_f$ through switching point 710-I as closed by controller 711. When U answers telephone 103, which is presumably at the same physical location as user U, a new talking path is established from FCMA 710 to telephone 103, the new path being composed of talking path 214-5, MSC 181 via switching point 181-F, trunk 132-4, AT 131 including switching point 131-D, trunk 127, CO 122, and talking path 125—this connection is denoted $C_U$. Once talking path $C_U$ is established, then (a) controller 711 closes switching point 710-J to bridge talking path $C_U$ to talking path $C_R$, and (b) controller 711 opens switching points 710-F, 710-G, and 710-H so that talking path $C_C$ may be torn down by the usual call termination procedures.

It is noted that now U's cellular phone 151 is again available for receiving another incoming call and, moreover, since monitor circuit 712 now monitors talking path 214-5, it is possible to re-transfer a connection between user U's cellular phone telephone and U's fixed telephone.

Summary of the Flow of a Transfer from $C_C$ to $C_U$

Figure 12:
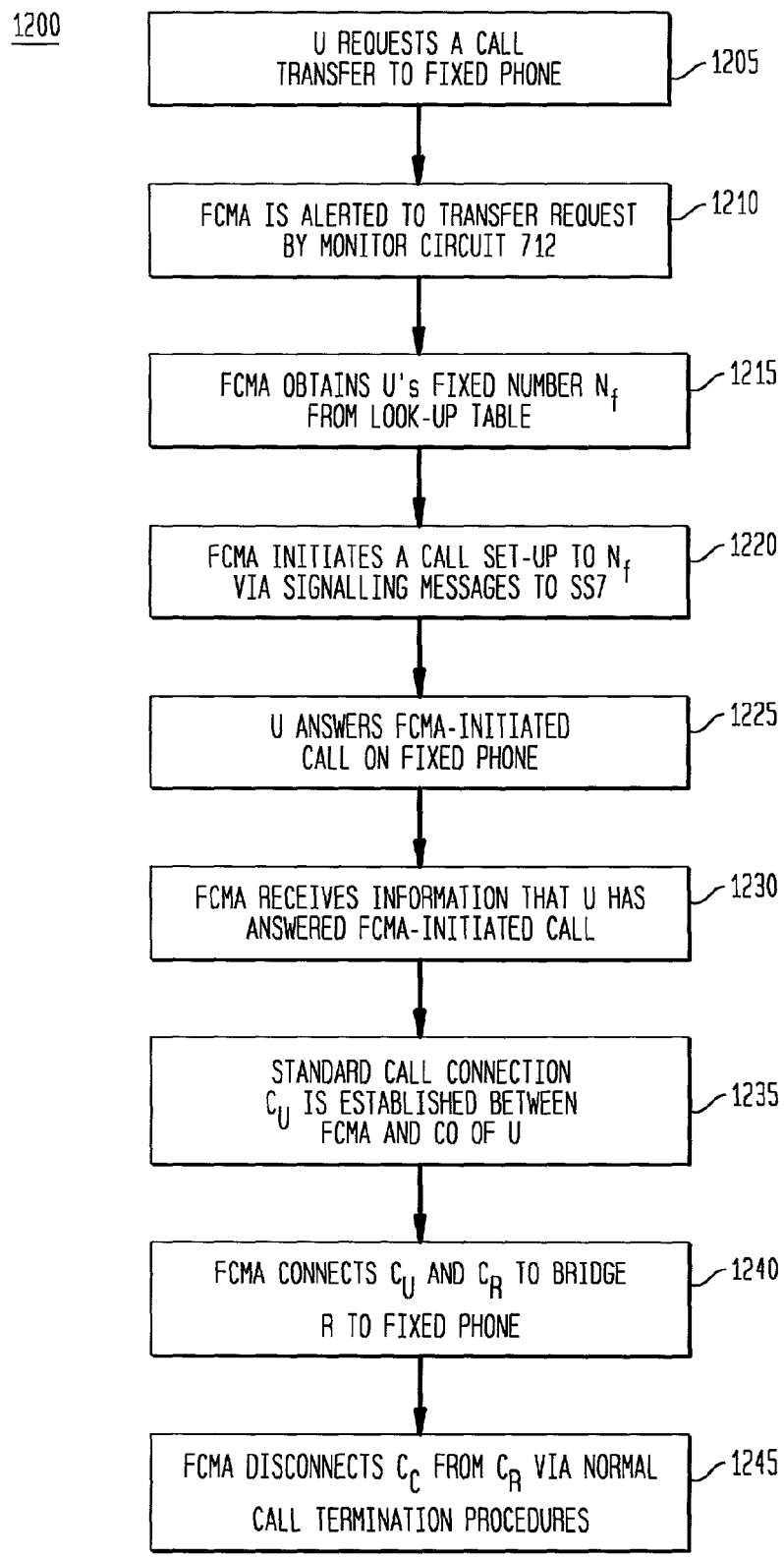
FIG. 12 is a flow diagram for processing the transfer of an established incoming call from the cellular network to the fixed network.

With reference to flow diagram 1200 of FIG. 12, the program flow effected by FCMA 710 for call transfer is as follows (note that the telephony-type functionality required of FCMA 710 is shown in parentheses after each step):

1.) block 1205—U requests a call transfer to fixed phone
   (monitoring)
2.) block 1210—FCMA is alerted to call transfer request by monitor circuit 712
3.) block 1215—FCMA obtains U's fixed number $N_f$ (908-555-1111) in CFCTS look-up table
4.) block 1220—FCMA initiates a call set-up to 908-555-1111 via signaling messages to SS7 network
   (call initiation)
5.) block 1225—U answers FCMA-initiated call by answering fixed telephone
6.) block 1230—FCMA receives information that U has answered FCMA-initiated call
   (call answered)
7.) block 1235—Standard call connection $C_U$ is established between FCMA and CO 122 by U answering incoming call
8.) block 1240—FCMA connects $C_U$ and $C_R$ to bridge call from R to fixed phone
   (switching)
9.) block 1245—FCMA disconnects $C_C$ from $C_R$ via switching to tear down of the established connection between R and U on the cellular network
   (switching)

3.1) Outgoing Calls Handled by the FCMA

To make an outgoing call from either the fixed telephone 103 or the mobile terminal 151 identified with a particular user (again referred to as U) to a remote party (say to party R at remote telephone 101), U first dials an access number $N_a$; $N_a$ is not user specific. All CFCTS users assigned to a given MSC can access the same $N_a$. When U dials $N_a$, the call is routed to the FCMA. For instance, with reference to FIG. 13, which depicts the arrangement for handling an outgoing call by U from his/her fixed phone 102 to R, the call by U is answered by the called party surrogate to R, namely, phone 101-1 shown dashed in FIG. 13, via switching point 710-K. This call is completed over a call connection path $C_U$ including: wire pair 125, CO 122, trunk 127, AT 131 including switching point 131-E, trunk path 132-5, MSC 181 including switching point 181-G, and trunk 214-6. Next, U is prompted by FCMA 710, via digit collector 1313, to provide the telephone number of party R. Then FCMA 710, in its capacity as a surrogate to initiate a call, initiates a call to party R via surrogate phone 103-1 through switching point 710-L. Whenever party R answers phone 101, then another call connection path $C_R$ is established between FCMA 710 and party R, the path including: trunk 214-7, MSC 181 including switching point 181-H, trunk 132-6, AT 131 including switching point 131-F, trunk 126, CO 121, and wire pair 124. FCMA 710 then bridges $C_U$ and $C_R$.

Summary of the Flow of a Transfer from $C_C$ to $C_U$

Figure 14:
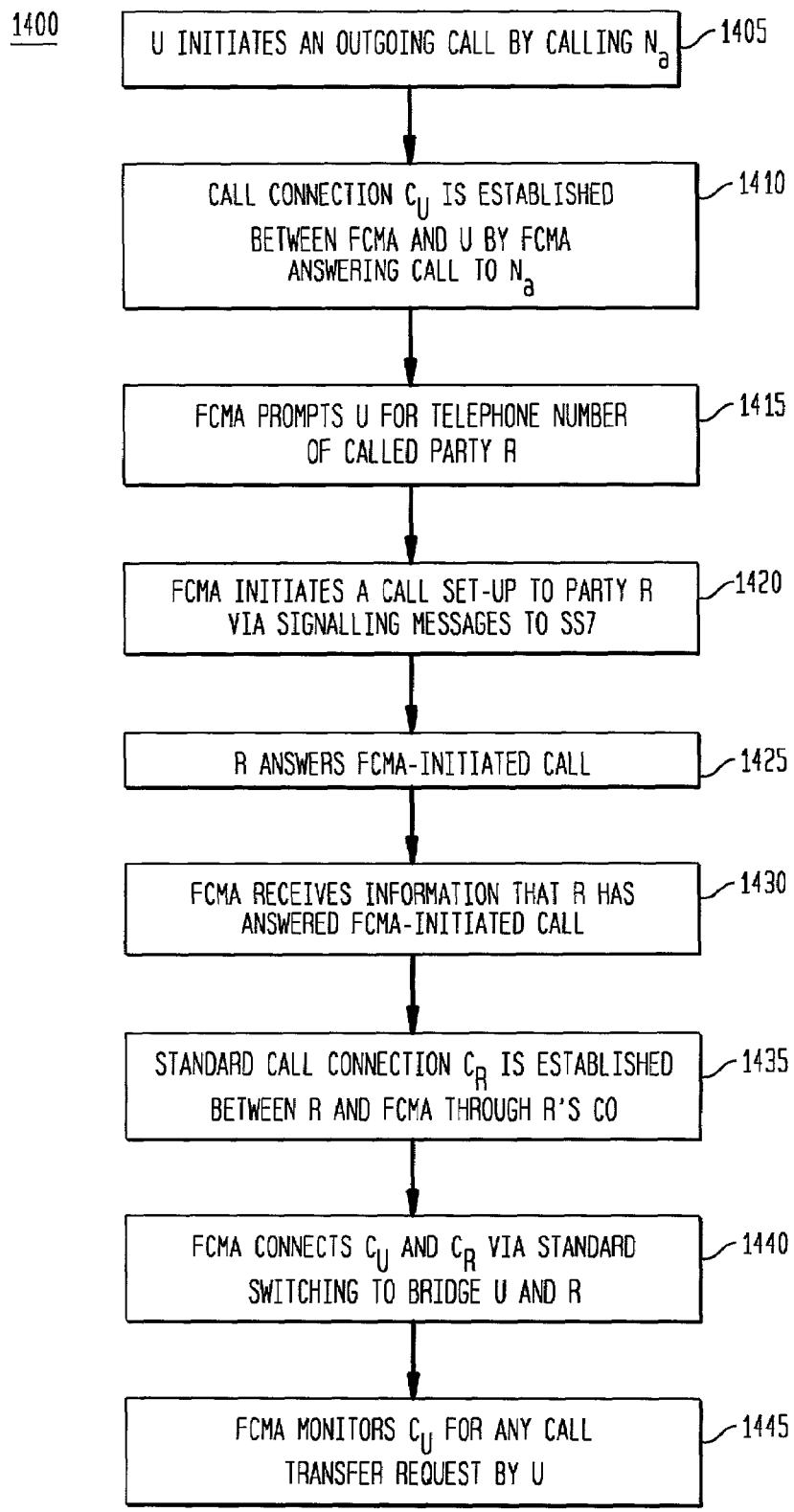
FIG. 14 is a flow diagram for processing an outgoing call from the fixed phone of a subscriber/user of the cellular-fixed call transfer service.

With reference to flow diagram 1400 of FIG. 14, the program flow effected by FCMA 710 for an outgoing call by U to R is as follows (note that the telephony-type functionality required of FCMA 710 is shown in parentheses after each step):

1.) block 1405—U initiates an outgoing call by calling $N_a$
2.) block 1410—Standard call connection $C_U$ is established between FCMA and CO 122 by FCMA answering call to $N_a$
   (call answer)
3.) block 1415—FCMA prompts U for telephone number of party R
   (digit collection)
4.) block 1420—FCMA initiates a call set-up to party R via signaling messages to SS7
   (call initiation)
5.) block 1425—R answers FCMA-initiated call
6.) block 1430—FCMA receives information that R has answered FCMA-initiated call
   (call answered)
7.) block 1435—Standard call connection $C_R$ is established between FCMA and CO 121 by R answering incoming call
8.) block 1440—FCMA connects $C_U$ and $C_R$ to bridge call from U to R
   (switching)
9.) block 1445—FCMA monitors $C_U$ for call transfer
   (monitoring)

Figure 13:
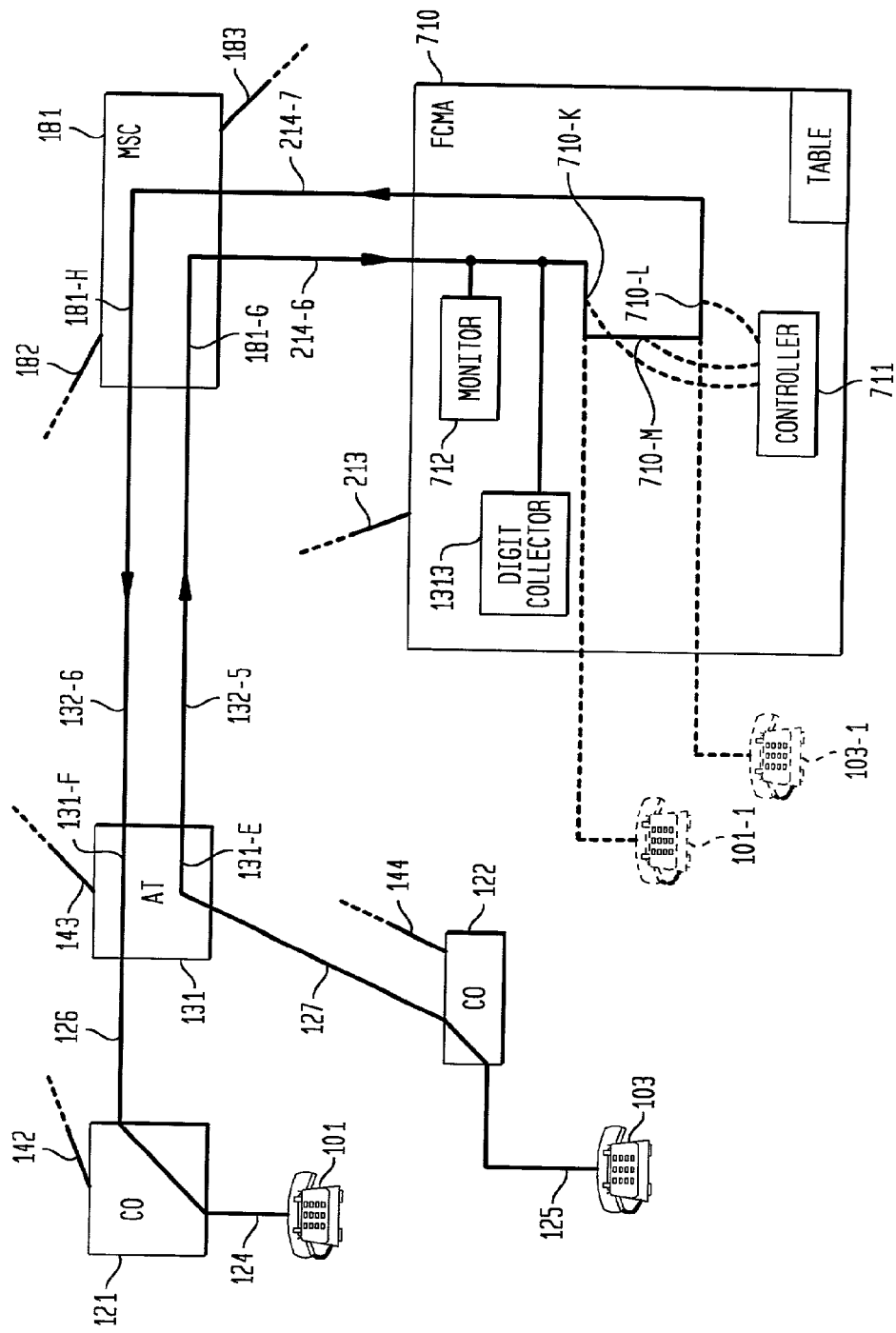
FIG. 13 depicts an illustrative arrangement for completing an outgoing call from the fixed phone of a subscriber/user of the cellular-fixed call transfer service.

Upon comparison of FIG. 13 with FIG. 3, including the description of each, it is clear that the call completion paths are essentially the same. (Although a directional orientation has been shown on the paths by arrows, this designation is only for the purpose of depicting the party initiating or receiving the calls. Call connections in themselves have no directional orientation.). Accordingly, to now effect a call transfer given the circuit state shown in FIG. 13, the arrangement and discussion of FIG. 7 applies equally as well to the arrangement of FIG. 13. In addition, flow diagram 800 of FIG. 8 applies also to a call transfer.

Now, with respect to U completing an outgoing call to party R via U's cellular phone 151, the final call completion paths are as shown in FIG. 9. To arrive at the call paths summarized by FIG. 9 for an outgoing call from U to R, again there is a need to collect digits from U once U's call to $N_a$ has been completed. Because the outgoing call paths from U to R are those of FIG. 9, then a call transfer can be effected in the same manner as set forth by flow diagram 1200 of FIG. 12 which describes the operation of the arrangement of FIG. 11 for a call transfer.

Although various embodiments which incorporate the teachings of the present invention have been shown and described in detail herein, those skilled in the art can readily devise many other varied embodiments that still incorporate these teachings.

What is claimed is:

1. A system for enabling a telephone subscriber to switch an on-going telephone call between wireline services provided through a central office in the public switched telephone network and cellular services provided by a mobile switching center in a cellular network after the telephone call has been initially routed to the telephone subscriber, the system comprising
   a routing table for identifying specific telephone subscribers entitled to switch an on-going telephone call between wireline and cellular services,
   a look-up table identifying the correspondence of said one telephone subscriber's wireline and cellular telephone numbers, a monitor circuit responsive to a unique signal during the on-going telephone call that had already been established to the telephone subscriber from said one telephone subscriber indicating a desired transfer of said on-going telephone call between said one specific telephone subscriber's wireline and cellular telephones, and switch means responsive to said monitor circuit for effecting said transfer of said on-going telephone call.

2. The system for enabling a telephone subscriber to switch an on-going telephone call between wireline services provided through a central office in the public switched telephone network and cellular services provided by a mobile switching center in a cellular network in accordance with claim 1 wherein said look-up table is in said mobile switching center.

3. The system for enabling a telephone subscriber to switch an on-going call between wireline services provided through a central office in the public switched telephone network and cellular services provided by a mobile switching center in a cellular network in accordance with claim 1 and further comprising:

a fixed cellular mobility agent associated with said mobile switching center, said fixed mobility agent having switching and signaling capabilities, and wherein said routing table is in said central office, an incoming call to one of said specific telephone subscribers being routed to said fixed mobility agent in response to an output of said routing table when said incoming call is addressed to said one subscriber's third number, said fixed mobility agent obtaining from said look up table said one subscriber's cellular telephone number, and said look up table, said monitor circuit, and said switch means are in said fixed cellular mobility agent.

4. A method for enabling a telephone subscriber to switch an on-going telephone call between wireline services provided through a central office in the public switched network and cellular services provided by a mobile switching center in a cellular network after the telephone call has been initially established between wireline and cellular services, said method comprising the steps of:

identifying in a routing table in the central office specific telephone subscribers entitled to switch telephone calls between wireline and cellular services;

providing a correspondence between said specific subscriber's wireline and cellular telephone numbers;

monitoring a signal from one of said specific telephone subscribers during the existence of an on-going telephone call that had previously been established to said specific subscriber to initiate a call transfer between said subscriber's wireline and cellular telephones; and enabling a switch to effect the transfer in response to said monitored signal.

5. The method for enabling a telephone subscriber to switch an on-going telephone call between wireline services provided through a central office in the public switched network and cellular services provided by a mobile switching center in a cellular network in accordance with claim 4 wherein said correspondence of said specific subscriber's wireline and cellular telephone numbers is contained in a look-up table in the mobile switching center.

6. The method in accordance with claim 5 wherein said enabling step is performed by said mobile switching center.

7. The method for enabling a telephone subscriber to switch an on-going telephone call between wireline services provided through a central office in the public switched telephone network and cellular services provided by a mobile switching center in a cellular network in accordance with claim 4 wherein said correspondence between said specific subscriber's wireline and cellular telephone numbers is contained in a look-up table in a fixed cellular mobility agent associated with said mobile switching center, said monitoring step and said switch enabling step being performed by said fixed cellular mobility center.

8. A method for enabling a telephone subscriber to switch an on-going telephone call between wireline services provided through a central office in the public switched network to the subscriber's wireline telephone and cellular services provided by a mobile switching center in a cellular network to the subscriber's cellular telephone after the telephone call has been initially routed to the telephone subscriber, said method comprising the steps of:

establishing a call connection to one of said subscriber's telephones;

monitoring said call connection to a subscriber entitled to switch calls between that subscriber's wireline and cellular telephones to detect a request signal for such transfer;

obtaining the telephone number of the other of said subscriber's wireline and cellular telephones not presently engaged in the telephone call; and responsive to a signal from said subscriber during the already established connection to said one of said subscriber's telephones, switching the telephone call to said other of said subscriber's wireline or cellular telephones and terminating the connection to said one of said subscriber's wireline or cellular telephones.

9. The method in accordance with claim 8 wherein said call connection to said subscriber is through a mobile switching center.

10. The method in accordance with claim 9 wherein said connection to said subscriber is through a fixed cellular mobility agent and said monitoring step alerts said fixed cellular mobility agent to said request.

11. The method in accordance with claim 10 wherein said establishing, switching, and terminating steps are performed by said fixed cellular mobility agent.

12. A system for enabling a telephone subscriber to switch an on-going call between wireline services provided through a central office in the public switched telephone network and cellular services provided by a mobile switching system center in a cellular network after the telephone call has been initially routed to the telephone subscriber, said system comprising:

a fixed cellular mobility agent having the functionality of a central office and coupled to said mobile switching center, said fixed cellular mobility agent comprising means for establishing a connection to one of a subscriber's wireline and cellular telephones;

means for monitoring and detecting a request from said one subscriber during said already established connection to transfer the call connection to the other of said subscriber's wireline or cellular telephones; and means for switching the connection in response to said detected request.

13. A method for enabling a telephone subscriber to switch an already established on-going telephone call to one of said subscriber's wireline and cellular telephones to the other of the subscriber's telephones, said subscriber wireline and cellular telephones being assigned different telephone numbers, said method comprising the steps of monitoring a call connection to one of said subscriber's telephones to detect a request by said subscriber to switch the already established on-going connection between said subscriber's telephones, obtaining the telephone number of said other of said subscriber's telephones, initiating an outgoing call from said other of said subscriber's telephones, and bridging the connections to said one and said other of said subscriber's telephones and terminating the connection to said one of said subscriber's telephones.

14. The method in accordance with claim 13 further comprising alerting a mobile switching center in a cellular network of the detection of said request by said monitoring step and wherein said initiating step is effected by said mobile switching center.

15. The method in accordance with claim 14 wherein said connection to said one telephone of said subscriber is through said mobile switching center.

16. The method in accordance with claim 13 further comprising alerting a fixed cellular mobility agent of the detection of said request by said monitoring step and wherein said initiating step is effected by said fixed cellular mobility agent.

17. The method in accordance with claim 16 wherein said connection to said one telephone of said subscriber is through said fixed cellular mobility agent.

18. The system in accordance with claim 1 wherein said look-up table identifies the correspondence between said one telephone subscriber's wireline telephone number, said cellular telephone number, and a third number for calls to said one subscriber's cellular telephone that can be transferred during the on-going telephone call to said one subscriber's wireline telephone.

19. The method in accordance with claim 7 wherein said look-up table contains the correspondence between said wireline and cellular telephone numbers and a third number for calls to said one subscriber's cellular telephone that can be transferred during the on-going telephone call to said one subscriber's wireline telephone.

* * * * *